United States Patent
Hirsch

[15] 3,684,043
[45] Aug. 15, 1972

[54] SNOWMOBILE HAVING ARTICULATED BOGEY WHEEL SUSPENSION MEANS

[72] Inventor: Roger D. Hirsch, Milwaukee, Wis.

[73] Assignee: Bangor Punta Operations, Inc., Greenwich, Conn.

[22] Filed: March 19, 1970

[21] Appl. No.: 20,938

[52] U.S. Cl. .................................. 180/5 R, 305/27
[51] Int. Cl. ....................... B62d 55/16, B62m 27/02
[58] Field of Search .......................... 180/5; 305/27

[56] References Cited

UNITED STATES PATENTS

| | | |
|---|---|---|
| 1,786,430 | 12/1930 | Kegresse..................305/27 |
| 2,051,864 | 8/1936 | Knox..................305/27 UX |
| 3,285,676 | 11/1966 | Hetteen..................305/27 |
| 1,539,582 | 5/1925 | Landry..................305/27 |
| 2,041,599 | 5/1936 | Fergusson..................305/27 |
| 2,019,654 | 11/1935 | Carden..................305/27 |
| 3,309,150 | 3/1967 | Marier..................180/5 X |

*Primary Examiner*—Richard J. Johnson
*Attorney*—Patrick J. Walsh

[57] ABSTRACT

A snowmobile having a flexible endless belt which is driven to engage the ground and propel the snowmobile over the ground, and articulated bogey wheel suspension means for said belt whereby suspends means suspends the snowmobile on the lower run of the belt and holds the belt in driving contact with the ground. The suspension means is articulated so as to accommodate undulating ground over which the snowmobile traverses.

1 Claim, 10 Drawing Figures

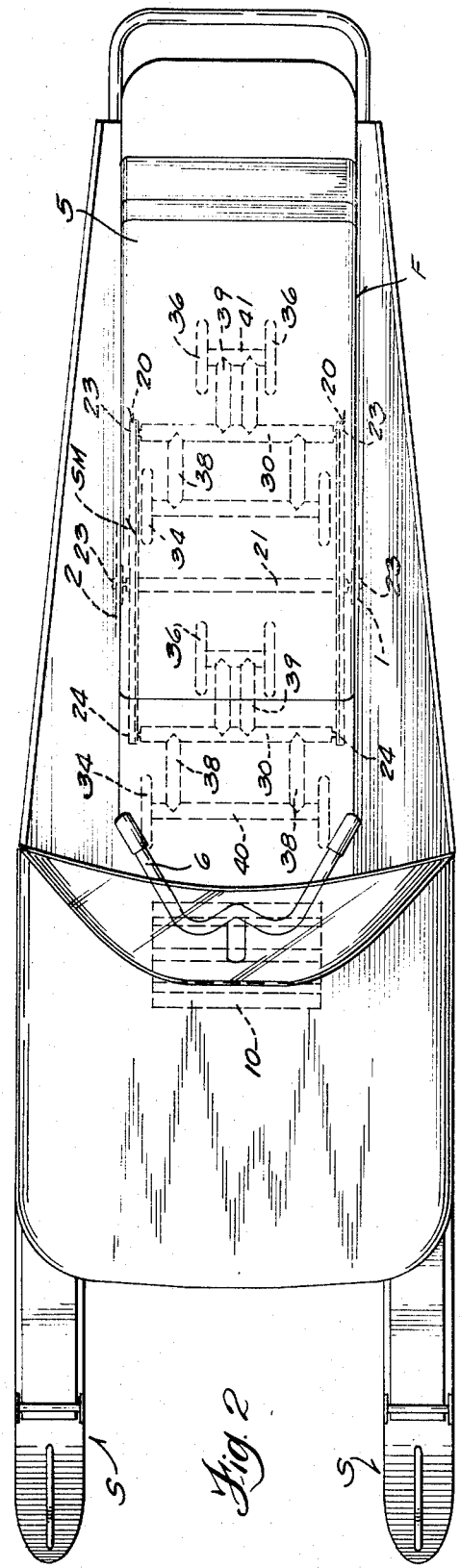
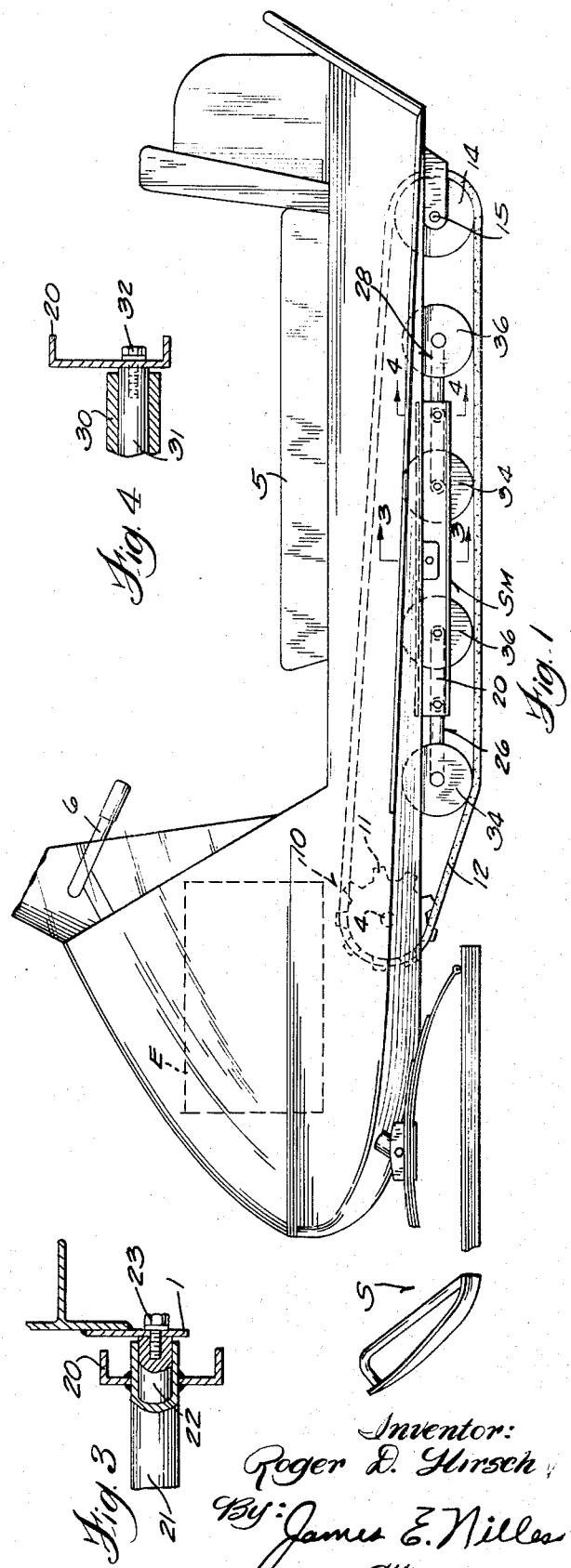

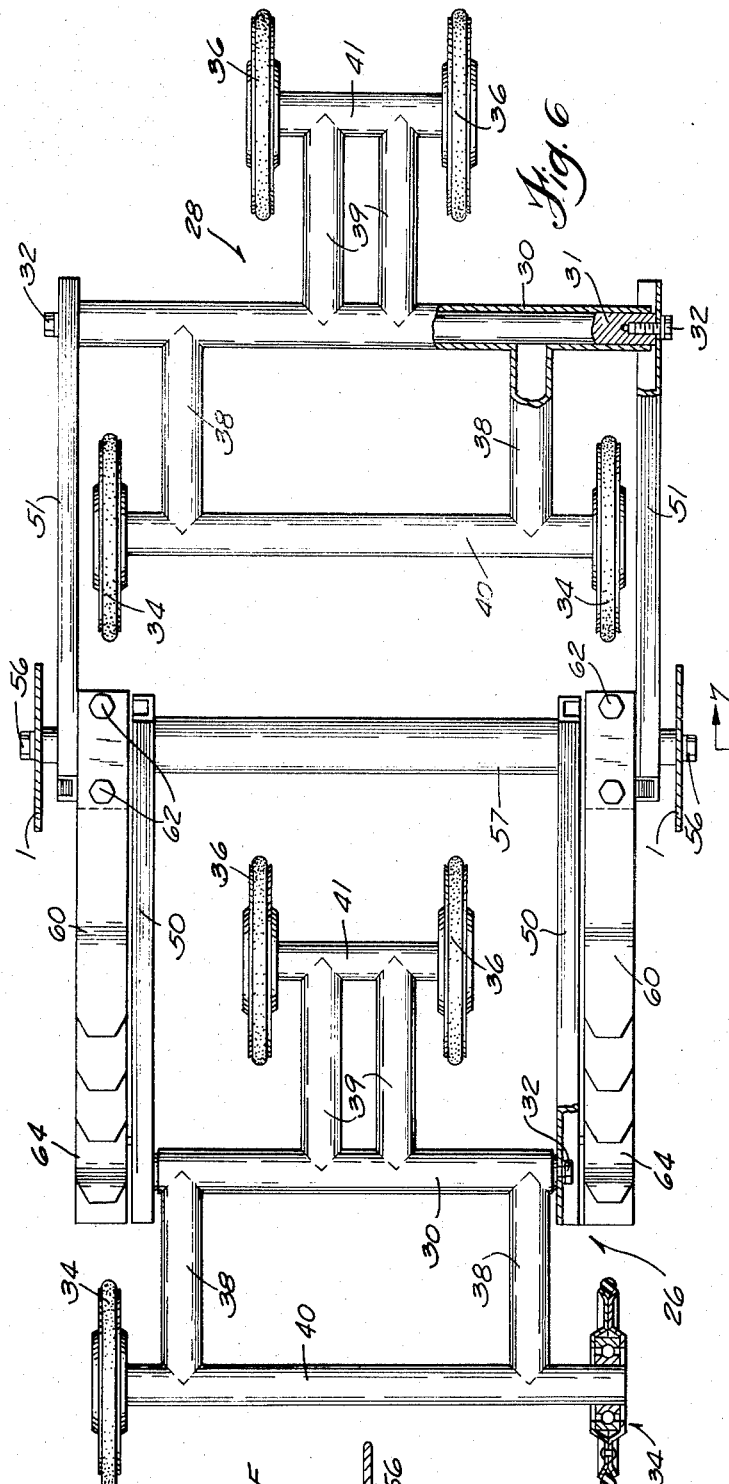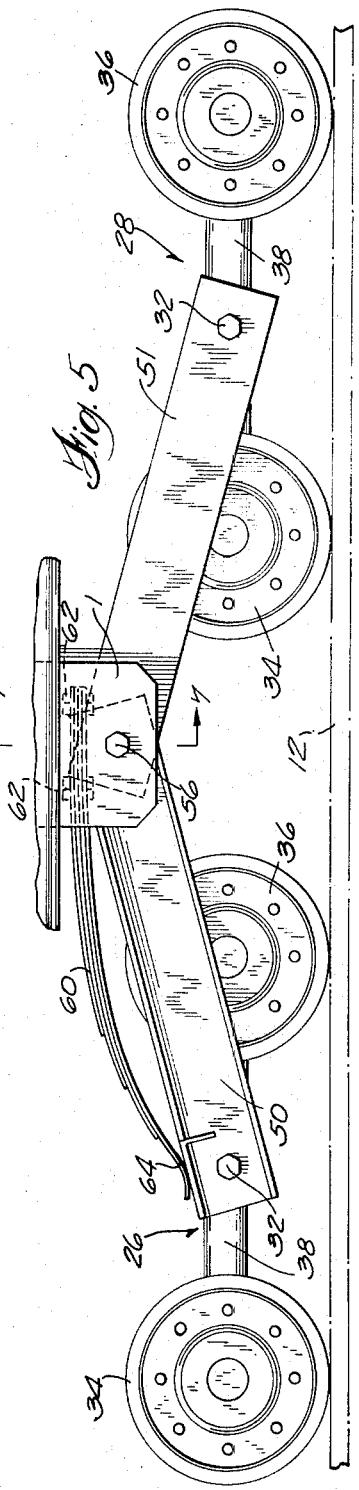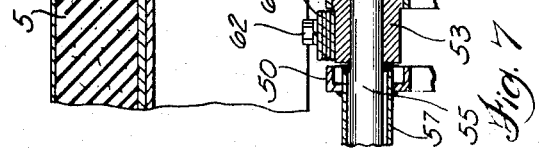

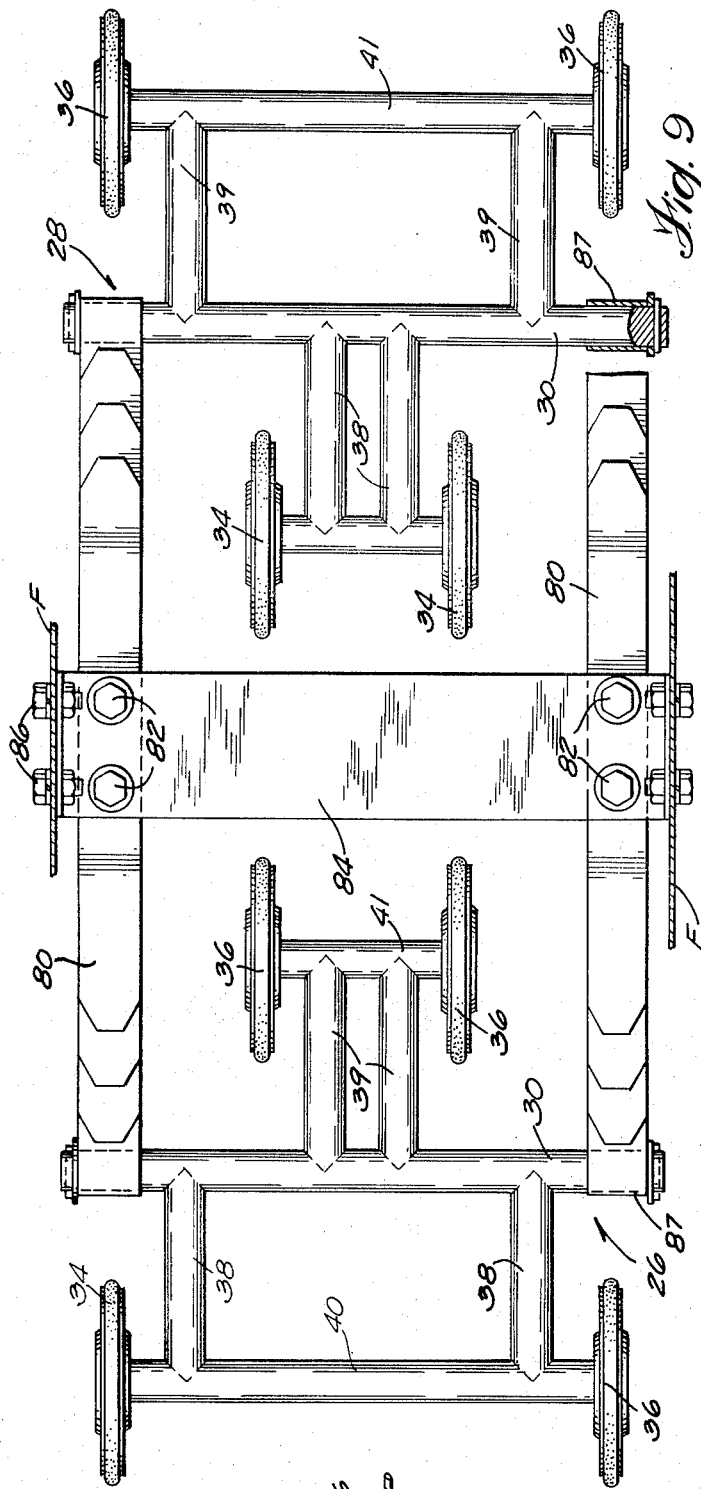
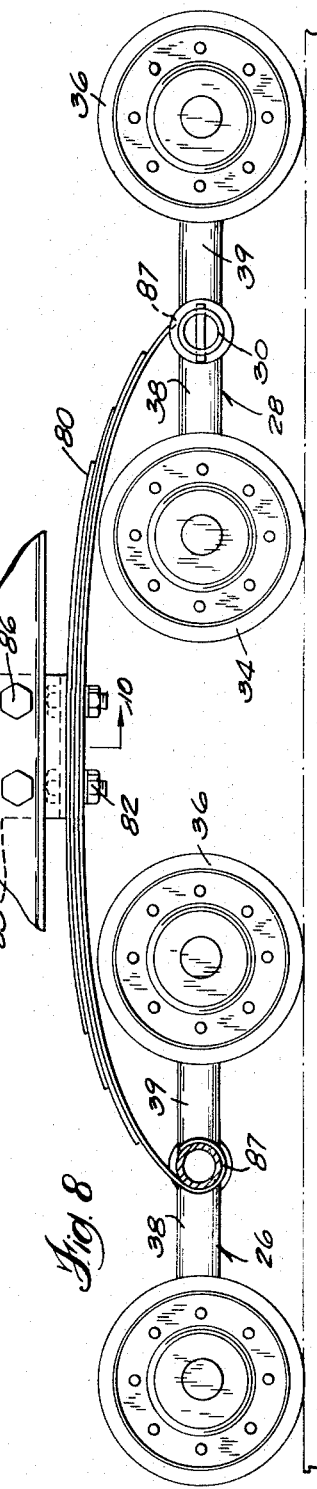
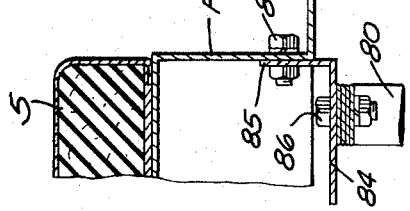

SNOWMOBILE HAVING ARTICULATED BOGEY WHEEL SUSPENSION MEANS

BACKGROUND OF THE INVENTION

The invention pertains to self-propelled vehicles of the type which are adapted to be driven over the snow by an endless, ground engaging, power driven belt. It is necessary in devices of this type to insure that the belt makes proper and rather complete contact with the ground regardless of the uneven terrain. Various prior art proposals have been used for holding the driven belt into the ground and supporting the snowmobiles on the belt.

These prior art devices have worked satisfactory, but were generally complicated and expensive due to the numberous number of parts and particularly to the number of bogey wheels required to properly maintain the belt in proper attitude to the ground. Examples of such prior art snowmobiles are shown in the U.S. Pat. No. 3,494,438, issued Feb. 10, 1970 and entitled "Adjustable Snowmobile Suspension," U.S. Pat. No. 3,439,763, issued Apr. 22, 1969 entitled "Endless Track Attachment for Motorized Cycles," and 3,023,824, issued Mar. 6, 1962 entitled "Endless Track Vehicles".

U.S. Pat. No. Re. 26,775 of Jan. 20, 1970 entitled "Snowmobiles" shows a suspension of the single beam type which is swingable about one end and to which the individual bogey wheels are attached directly.

U.S. Pat. No. 3,474,751 of Oct. 28, 1969, entitled "Amphibious Snow Vehicle" and U.S. Pat. No. 3,199,620 of Aug. 10, 1965, entitled "Traction Device" each show the use of leaf springs to which the bogey wheels are directly mounted.

SUMMARY OF THE PRESENT INVENTION

The present invention provides a snowmobile having a particularly efficient, articulated bogey wheel suspension means which is engaged with the lower portion of the endless, ground engaging belt. The suspension means includes a pair of longitudinally extending beam means which are mounted intermediate their length to the snowmobile frame, and then the free front ends of the beam and the free rear ends of the beams have a bogey wheel assembly pivotally mounted between said front ends and said rear ends. The result is that the beam means themselves can pivot relative to the frame and also the individual bogey wheel assemblies can pivot relative to the beams.

A more limited aspect of the invention relates to the bogey wheel assemblies including a central and transversely positioned shaft mounted between the transversely aligned ends of the beam means, and bogey wheels are mounted both in front and to the rear of the shaft means and in spaced relation thereto whereby the wheels can rise and fall about the shaft means.

A more specific aspect of the invention relates to the beam means being of the split beam type and wherein leaf spring means are provided between the split pieces of the beam means so as to bias each of the individual beam pieces against the lower run of the endless belt and towards the ground.

Still another aspect of the invention relates to the snowmobile of the above type in which the beam mean comprises a longitudinally extending leaf spring which is rigidly secured intermediate its length to the frame and which has a bogey wheel assembly pivotally mounted to the ends of the leaf spring means.

These and other objects and advantages of the present invention will appear hereinafter as this disclosure progresses, reference being had to the accompanying drawings.

BRIEF DESCRIPTION OF THE DRAWINGS

FIG. 1 is a side elevational view of a snowmobile embodying one modification of the invention, certain parts being broken away;

FIG. 2 is a plan view of the snowmobile shown in FIG. 1;

FIG. 3 is an enlarged, detail sectional view taken along line 3—3 in FIG. 1;

FIG. 4 is an enlarged, detail sectional view taken along line 4—4 in FIG. 1;

FIG. 5 is a side elevational view of a portion of a snowmobile and showing a modification of the articulated bogey wheel suspension means;

FIG. 6 is a plan view of the suspension means shown in fIG. 5, certain parts being shown as broken away and in section;

FIG. 7 is a detailed, sectional view taken along line 7—7 in FIG. 5;

FIG. 8 is a view similar to FIG. 5, but showing another form of suspension means, one of the parts being shown in section;

FIG. 9 is a plan view of the suspension means shown in FIG. 8, certain parts being shown in section; and FIG. 10 is a view taken along line 10—10 in FIG. 8.

DESCRIPTION OF A PREFERRED EMBODIMENT

Referring in particular to FIGS. 1 and 2, a snowmobile has been shown as being typical to that in which the invention finds particular utility, and such a snowmobile includes an elongated frame F having steel side members 1 and 2 which are arranged in laterally spaced relationship to one another. A front steering mechanism S of the steerable ski type is located at the forward end of the snowmobile an an internal combustion engine E is provided for driving the drive shaft 4 which is journalled in the frame F. An operator seat 5 is provided and a steering bar 6 is also provided within easy reach of the operator.

Forward rotary means 10 are fixed to shaft 4 for being driven thereby and this rotary means for example, comprises a toothed drumlike member, the teeth 11 of which can engage the complementary shaped sockets on the inner surface of the endless and flexible ground engaging member 12. Member 12 can be of the rubber type and is of considerable width, say for example 15 inches and is of particularly rugged construction. Rearward rotary means 14 are journalled on shaft 15 which in turn is mounted in the frame F of the snowmobile and as shown, it will be noted that the endless flexible ground engaging member 12 is trained about both rotary means for contact with the ground and for pivoting traction propulsion of the snowmobile over the ground.

In accordance with the present invention, an articulated bogey wheel suspension means SM is mounted on the frame F and is engagable with the inner surface of the ground engaging run of endless member 12 to thereby support the snowmobile on the lower portion of the endless member and thereby hold the endless member in driving contact with the ground.

In all of the modifications of the suspension means shown, the suspension means includes a pair of longitudinally extending beam means which are mounted intermediate their length to the frame, and which beam means have free front ends and free rear ends. One of such beam means is located adjacent each side of the frame, as will now be described in detail.

FIGS. 1—4

As shown in the modifications of FIGS. 1 and 2, the beam means comprises a substantially rectilinear U-shaped channel member 20, one such channel member being positioned adjacent each side of the frame F. These beam members have a central, tubular sleeve 21 (FIG. 3) extending through and connecting their central portions and welded thereto. A shaft 22 is located within sleeve 21 and is fixed to the side members 1 and 2 by bolt means 23 extending through the side members and threadably engaged in the ends of the solid shaft 22.

Tubular sleeve 21 can rotate on shaft 22 and thereby with this construction, the beams 20 are pivotally mounted intermediate their length to the main frame. This permits the beams to oscillate about their point of pivotal connection to the frame F, and causing their free front ends 24 and free rear ends 25 to swing up and down.

A bogey wheel assembly 26 is pivotally mounted between and to said front ends 24 for swinging in respect thereto and a similar, second bogey wheel assembly 28 is similarly mounted between and to the free rear ends 25 of said beam means for swinging in respect thereto. More specifically, each bogey wheel assembly comprises a central and transversely positioned mounting sleeve 30 which is journalled on a solid shaft 31 (FIGS. 4 and 6) that in turn is fixed by a machine bolt 32 to each of the beam means 20, thereby rigidly interconnecting the same. A pair of bogey wheels 34 are mounted toward the front side of sleeve 30 and a pair of bogey wheels 36 are mounted toward the rear side of sleeve 30. These pairs of wheels are mounted by their respective pairs of struts 38 and 39 which in turn are welded to the tubular sleeve 30 and to respective shorter axle-like 40 and 41 of the front wheels 34 and rear wheels 36, respectively.

Thus, each bogey wheel assembly is free to oscillate about its associated interconnecting shaft 31 thereby permitting the pairs of wheels 34 and 36 to rise and fall about the shaft 31.

FIGS. 5—7

Referring now to FIGS. 5–7, instead of a single beam means 20 as shown in FIG. 1, the beam means comprises of two pieces 50 and 51 and having their adjacent ends pivoted relative to and mounted on the frame. More specifically, a steel block 53 is welded to the inside of the channel shaped piece 51 and this block is oscillatable on a central shaft 55 which is secured by cap bolt 56 to the side members of frame F of the snowmobile. The other, inner piece 50 is welded to a tube 57 which in turn is also oscillatable on the shaft 55. Thus, the pieces 50 and 51 are swingable about the shaft 55.

Resilient means are provided between the beam pieces 50 and 51 so as to urge their free ends downwardly, and this means comprises a leaf spring 60 which is rigidly fixed by bolts means 62 to the block 53 or in other words, rigidly fixed to the beam piece 51. The free end 64 of the leaf spring is adapted to abut against the upper side of the beam piece 50. In this manner, the leaf spring biases the free ends of both the beam pieces 50 and 51 downwardly.

Bogey wheel assemblies 26 and 28, previously described in connection with FIGS. 1 and 2, are mounted between the free ends of the beam pieces 50 and 51. As these bogey wheel assemblies are similar to those shown in connection with FIGS. 1 and 2, further description of them is not deemed to be necessary.

FIGURES 8 – 10

Referring to the embodiment of the invention shown in FIGS. 8 – 10, the beam means comprises an elongated leaf spring 80 which is rigidly secured intermediate its length by the bolt means 82 and cross member 84 to the frame F of the snowmobile. The upturned flanges 85 of the cross member 84 are secured to the frame by the bolt means 86. The free ends of the leaf spring 80 are formed into a generally circular end 87 (FIG. 8) and embrace the shaft 30 of the front bogey wheel assembly 26. The rear bogey wheel assembly 28 is similarly mounted for oscillation in the rear, generally circular formed leaf spring end. Here again, the bogey wheel assemblies are similar to the assemblies shown in the other views and further description is not believed to be necessary or desirable.

GENERAL

In all of the modifications of the invention, it will be noted that a highly flexible and articulated suspension means is provided for holding the lower run of the endless member 12 firmly against the ground and also firmly supporting the snowmobile on the member 12. This exceptionally good flexibility is accomplished with the use of a minimum number of bogey wheels. In all of the modifications, a bogey wheel assembly is pivotally mounted between and to the front ends of the beam means for swinging in respect thereto and a second bogey wheel assembly is pivotally mounted between and to the rear ends of said beam means for swinging in respect thereto.

The belt 12 itself acts as a cushion and the springs used with certain modifications of the present invention are relatively stiff to provide for good stability of the vehicle.

I claim:

1. In a snowmobile vehicle having a frame, controllable ski means carried by said frame at the forward end thereof for partially supporting the vehicle and directing the same, an endless traction belt, a pair of rotary means journalled on said frame in longitudinally spaced relation over a major length of said vehicle aft of said ski means and about which said belt is trained, said rotary means and said belt having substantial transverse width relative to the snowmobile vehicle thereby to provide a ground-engaging run of said belt with an area to effect desired traction, a plurality of bogey wheels mounted intermediate said spaced rotary means for engagement with said ground-engaging belt run to enhance belt traction and support of said vehicle thereby, and power means on said vehicle frame cooperatively associated with said rotary means thereby to drive said belt;

the improvement in the suspension mounting of said intermediate bogey wheels comprising:

a pair of longitudinally extending beam members disposed respectively adjacent said frame on opposite sides of said vehicle and between said rotary means, said beam members including portions extending forwardly and aft of said vehicle, affixing means for said beam members including a transverse pivot shaft secured adjacent its opposite ends to said frame intermediate said spaced rotary means, a tubular sleeve rotatably journalled on said shaft, said beam members being affixed to said sleeve at opposite ends thereof, and wherein said beam members are substantially rectilinear, thereby minimizing the vertical height of said suspension assembly, said affixing means together with said beam members cooperating to permit relative movement between said beam members and said frame, a shaft fixed to and interconnecting said forward portions and a shaft fixed to and interconnecting said aft portions of said beam members, a bogey unit mounting sleeve rotatably journalled on each said interconnecting shaft, a plurality of struts rigidly affixed to and projecting radially from said bogey mounting sleeve in substantially opposite directions, a pair of transverse axle mount means affixed to said struts, and, bogey wheels rotatably associated with said axle mount means at opposite ends thereof, said axle mount means and the bogey wheels thereon are of lesser transverse width than the said interconnecting shafts, whereby said bogey units may be pivoted through substantially 180° between said beam members without interference therewith, thereby to effect repositioning of and access to said bogey wheels.

* * * * *